(No Model.)
E. HELL.
ARTIFICIAL STALK.
No. 533,644. Patented Feb. 5, 1895.
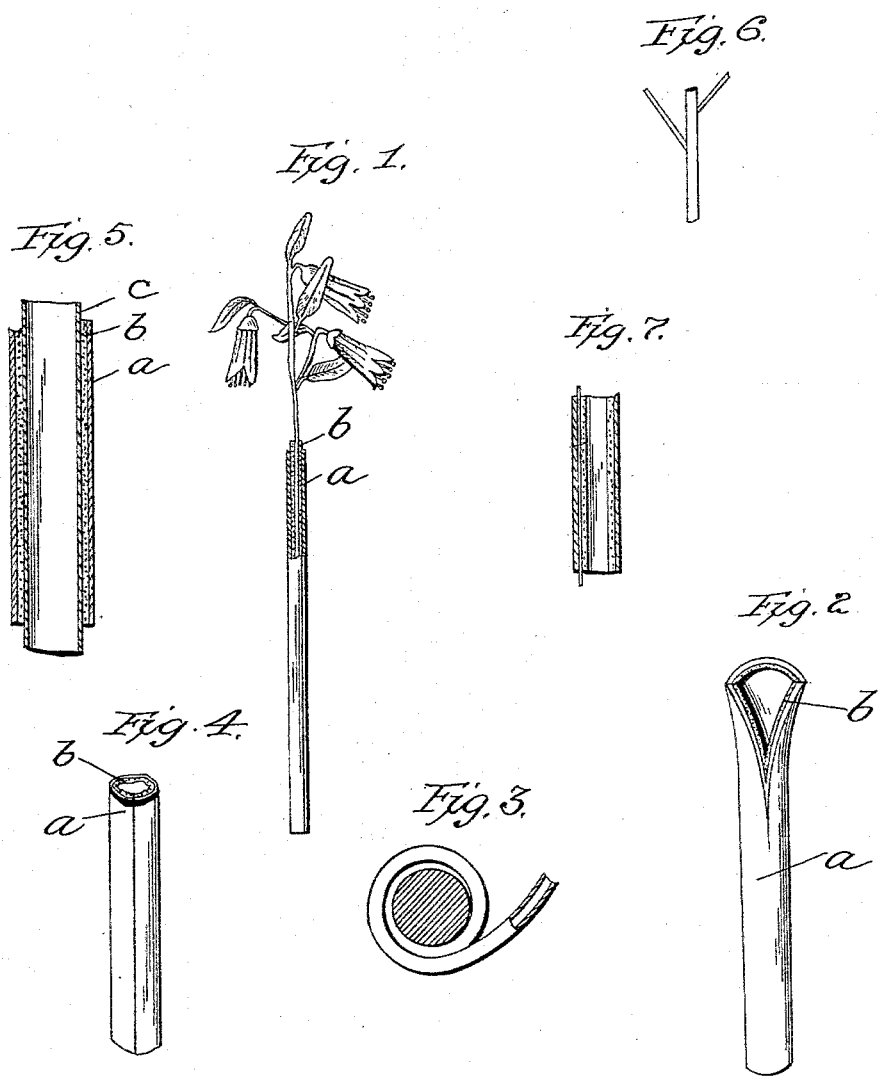

UNITED STATES PATENT OFFICE.

ELISABETH HELL, OF ULM, GERMANY.

ARTIFICIAL STALK.

SPECIFICATION forming part of Letters Patent No. 533,644, dated February 5, 1895.

Application filed March 31, 1894. Serial No. 505,813. (No model.) Patented in Germany November 25, 1894, No. 74,727.

*To all whom it may concern:*

Be it known that I, ELISABETH HELL, a subject of the King of Würtemberg, residing at 8 Neithardtstrasse, Ulm, Würtemberg, Germany, have invented certain new and useful Improvements in Artificial Stalks, of which the following is a specification.

The invention has been patented in Germany as No. 74,727, dated November 25, 1894.

When live cut flowers are bound together into bouquets or for the head dress by means of wires or the like they fade very soon.

The present invention is an artificial stalk, the object of which is to remedy this defect and is to be used instead of the wire.

The artificial stalk consists of a conical or straight tube made of very thin water proof material—for instance of gauze or other cheap fabric, sheet metal, aluminum, tin foils painted green, ribbed, and imitating perfectly nature as to size, form and color. The stalk is filled with scoured cotton or some other textile fabric (with or without an addition of fine sand) or other hygroscopic material which absorbs water quickly and returns the same to the flowers.

In order that the cut flower may be easily introduced in the artificial stalk a small piece of silk, paper or the like is pressed into the center of the same so that the cotton, &c., can not move in the least when the flower is introduced. This lining will be found desirable when the stalk is put up in tubular form.

The artificial stalk can also be filled or lined with compressed cotton, &c.

Figure 1 is a side view of a stalk partly in section. Fig. 2, is a side view of a stalk partly open longitudinally, and Fig. 3, shows a roll of the flexible material with the hygroscopic lining. Fig. 4, shows a tubular stalk divided longitudinally throughout its length. Fig. 5, is a detail view or the stalk enlarged showing the inner lining. Fig. 6, is a detail view of a main stalk with branches, and Fig. 7, shows a further modification.

The outer metallic or other covering is shown at $a$, the hygroscopic material at $b$ and the inner lining at $c$, Fig. 5.

The flowers are introduced into the flexible tube which can of course be of any size or strength and can be open entirely as in Fig. 4 or for half its length as in Fig. 2 (the tubing being wound around spools as in Fig. 3 so that it can be cut to the desired length) and it will be sufficient to compress the metal for keeping a flower tightly in its artificial stalk where it will receive a constant supply of moisture by means of the hygroscopic materials put into said stalk.

Flowers provided with this stalk can either be used separately, or bouquets can be made with them and they will keep fresh very long. The long complained of wire will not be necessary as the flowers, even those with the shortest possible stems, can be introduced into the artificial stalk without being touched by the metal which contact is prevented by the soft lining. The tubes can be put in water before using the same so that they can absorb sufficient water and are ready for use at any desired time.

For special purposes it will be possible to use a larger tube or stalk also lined with the above described material wherein thinner short or long stalks are introduced in such a manner that a hole is made in this main stalk for each smaller stalk which is then introduced and conveniently fixed into said main stalk by pressing together the metal of the latter. This modification is illustrated in Fig. 6.

Flowers treated in the described manner keep fresh for three or four days without further addition of water and if the stalks are dipped in water they will keep fresh longer than when their own stems are put into the water.

Instead of metallic tubes I can also use tubes made of some band or ribbon in a continuous manner, which are then covered with some elastic water proof cover or with a coat of green lac, varnish, compound of rubber material, &c., and still other constructions are possible as the object of the invention is simply to give the flowers a water proof cover lined with a material that absorbs water easily which can happen no matter what shape there be given to or what material be used. In cases where no metal is used it will be well to introduce a thin, small flexible metallic strip between the cover and the lining and along the latter or a wire $x$, as in Fig. 7 in order that the artificial stalk be sufficiently rigid and flexible at the same time.

It is obvious that the artificial stalk can be manufactured in many different ways.

I claim—

1. An artificial stalk for keeping cut flowers or live plants fresh, consisting of a tube of flexible, waterproof material lined with a hygroscopic material substantially as described.

2. An artificial stalk for cut flowers consisting of the outer covering of water proof material, the hygroscopic lining and the inner layer or covering therefor, substantially as described.

3. An artificial stalk for cut flowers consisting of the outer covering of water proof material, and the hygroscopic lining, substantially as described.

In testimony that I claim the foregoing as my invention I have signed my name in presence of two subscribing witnesses.

ELISABETH HELL.

Witnesses:
MAX EISELE,
ALBERT WEICKMANN.